April 28, 1964 R. W. HART 3,131,368
SIGNAL SELECTING APPARATUS
Filed Sept. 14, 1960

INVENTOR.
ROBERT W. HART
BY

3,131,368
SIGNAL SELECTING APPARATUS
Robert W. Hart, 123 Dartmouth St., Lynn, Mass.
Filed Sept. 14, 1960, Ser. No. 56,068
4 Claims. (Cl. 333—71)
(Granted under Title 35, U.S. Code (1952), sec. 266)

The invention described herein may be manufactured and used by or for the Government of the United States of America for governmental purposes without the payment of any royalties thereon or therefor.

The present invention relates generally to electrical signal receiving systems and more particularly to apparatus for and methods of improving the selectivity and sensitivity of the detecting portion of such systems.

The selectivity of a receiving circuit is a measure of its capacity to discriminate against interfering signals, noise and other random disturbances which are present in the transmission medium along with the intelligence signal. If the signal detecting operation is performed as an integration process, then the number of periods over which this integration takes place, as determined by frequency of the wanted signal, establishes the value of this selectivity and also, at the same time, the threshold level of the receiver's sensitivity. Conventional LC circuits have an integration time which in most cases is too short to suppress spurious signals excited in the detecting circuit by noise, impact and other random disturbances. Hence, the wave form developed across the output of these circuits may contain components which do not have their origin in the information signals.

In applicant's U.S. Patents Nos. 2,861,256 and 2,872,577 of November 18, 1958, and February 3, 1959, there is disclosed apparatus for extending the integration time of tuned circuits to several hundred periods by means of mechanically vibrating members. These dynamic systems have as their sensing components metallic or dielectric elements vibrating at a frquency preselected to conform to that of the incoming intelligence signals. In order to influence the output circuit, each incoming signal must make a cumulative incremental contribution to the amplitude of vibration of the mechanical member. Such reinforcement requires frequency and/or phase coherence. Prolongation of the integration period can be realized by requiring the amplitude of this vibration to exceed a predetermined threshold level, a result which can only come about after the occurrence of a multiplicity of matching cycles between the incoming signal and the vibrating element.

In some of the configurations disclosed in the above patents, the vibrating elements have the magnetostrictive or piezoelectric properties for purposes mostly concerned with the ease of driving such materials in various vibrational modes. But no use was made of the fact that some of the components of these drive systems, that is, the driving coil associated with the magnetostrictive member and the metallic electrodes associated with the piezoelectric member possess inductive and capacitive properties which can complement each other to bring about electrically resonant conditions in the drive and signal circuits. Such a combination of resonant systems produces maximum drive for the vibrating element, maximum signal levels in the input and output circuits and, therefore, superior sensitivity and selectivity.

It is accordingly a primary object of the present invention to provide a signal receiving system having complementary electrical and mechanical resonating features for improving signal sensitivity and selectivity.

Another object of the present invention is to provide a dynamic filtering system wherein mechanical and electrical resonant conditions are employed.

A further object of the present invention is to provide signal receiving apparatus for discriminating against spurious signals caused by noise and other disturbances wherein cooperating electrical and mechanical resonant systems combine to perform the frequency discriminating function.

A still further object of the present invention is to provide a dynamic filtering arrangement wherein signal selectivity and sensitivity are enhanced by an electrically tuned circuit having as one of its components part of the drive system of the mechanical mechanism.

A yet still further object of the present invention is to provide a signal detecting system wherein an electromechanical vibrating unit with an electrically tuned circuit having as one of its components an element of the vibrating apparatus performs the discriminating operation.

A still further object of the present invention is to provide a dynamic filtering arrangement wherein the vibrating member thereof is a magnetostrictive component whose drive coil also serves as the inductance of a complementary LC resonant circuit.

A still further object of the present invention is to provide a dynamic filtering arrangement wherein the vibrating member thereof is a piezoelectric component whose driving electrodes also serve as the capacitance of a complementary LC resonant circuit.

A yet still further object of the present invention is to provide a mechanical circulator for use as a signal discriminating means which is relatively unresponsive to the effects of noise and other types of spurious signals.

A still further object of the present invention is to provide an arrangement for achieving maximum drive for a vibrating element having piezoelectric properties.

A yet still further object of the present invention is to provide a driving arrangement for a piezoelectric member wherein magnetostrictive techniques are involved.

A yet still further object of the present invention is to provide a dynamic filtering arrangement wherein the current and voltage components of a tuned LC circuit both provide the driving energy for realizing maximum vibration at electrical resonance.

Other objects and many of the attendant advantages of this invention will be readily appreciated as the same becomes better understood by reference to the following detailed description when considered in connection with the accompanying drawings wherein:

FIG. 1 schematicallly illustrates the present invention employed with a magnetostrictive vibrating element;

Figure 1:
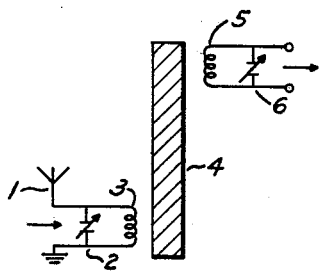

Preliminary signal selection in most communications systems, as mentioned hereinbefore, is usually performed by an LC circuit which, when tuned to resonance, maximizes the current and voltage conditions obtaining therein. However, circuits of this conventional design also develop a substantial output when excited by noise or other forms of signal disturbance because they do not have sufficient inertia to discriminate against random signals on a time basis. To obtain increased inertia, the systems disclosed in the aforementioned patents resort to various mechanical coupling arrangements which require the input signal to not only possess the proper frequency but also to persist for a predetermined minimum time before it can register in the output circuit. The following circuits disclose techniques for increasing the efficiency of these dynamic filters.

In one form of the present invention, the input signal energy is coupled to the driving coil of a magnetostrictive member whose length is selected so that it vibrates in a fundamental or multiresonant mode when excited by a signal of the correct frequency. When random signals and noise energy appear at this driving coil, the magnetostrictive member is not excited to full amplitude at mechanical resonance and, consequently, the energy introduced into the electromechanical system by these spurious signals is quickly dissipated and does not reach the output circuit. In order to add a further degree of selectivity and sensitivity to the system, the inductance of the driving oil and the output coil is tuned by variable capacitors to electrical resonance at the frequency of the wanted signal.

In an alternative mode, the input energy is applied to one set of electrodes of a piezoelectric member whose physical properties, like that of the magnetostrictive member, are preselected so that it vibrates in a resonant mode when the exciting voltage wave form has a frequency corresponding to that of the wanted signal. Also associated with the piezoelectric member is a pair of output electrodes, and the capacitance of these electrodes and/or that of the input electrodes is tuned to an electrically resonant condition at the wanted signal frequency by a variable inductance. Hence, in the case of the magnetostrictive member, input and output coils not only couple the signal energy into and out of the vibrating system, but also serve as inductances of tuned LC circuits for maximizing the magnitude of the wanted signal when it is present. Likewise, in the case of the piezoelectric configuration, the input and output electrodes perform the same signal coupling function and additionally serve as capacitances for similar LC circuits. It will be recognized, of course, that at electrical resonance, the voltage across the piezoelectric electrodes and the current through the excitation coil achieve their maximum values and, hence, excitation of the mechanical system is at its maximum value. In one modification, these voltage and current maxima are uniquely employed to produce piezoelectric and magnetostrictive stresses which combine to bring about maximum excitation of the vibrating element of the integrating system.

Referring to FIG. 1 which schematically illustrates the application of the present invention to the detecting portion of a conventional receiver, the signal energy arriving at antenna 1 is coupled to an LC circuit made up of capacitor 2 and inductor 3, the latter being the drive coil of a magnetostrictive element 4. In order to have available maximum current for driving element 4 when the wanted signal is present at the antenna, the LC circuit is tuned to the frequency of this signal. Also, the dimensional relationship between the length of the magnetostrictive element and the wave length of the wanted signal is selected such that the magnetostrictive member vibrates in a fundamental or multinode resonant condition when excited by the latter signal. This insures maximum signal transfer to output coil 5. It will be appreciated that there is a definite time lapse between the first appearance of the wanted signal and the development of a substantial output signal across coil 5. This delay, which partially establishes the integration period of the dynamic filter, is due to the mechanical coupling between the input coil 3 and the output coil 5 and is governed by the mode of vibration set up in the magnetostrictive element, the velocity of propagation of this mode within the magnetostrictive element, the latter's over-all length and the separation between the above coils. The magnetostrictive member thus functions to introduce a dynamic inertia into the system and, if this member is several wave lengths long in terms of the wanted frequency, it reacts against the coupling of transient signals between the two coils. The output signal is also maximized by capacitor 6 which tunes the inductance of coils to resonance at the wanted signal frequency. The signal appearing across this LC circuit serves as the input to the first amplifying stage of the receiver. Prolongation of the integration period can be accomplished by adjusting the level of blocking bias applied to this stage.

Unlike the mechanical integrators disclosed in the above applications, in this particular case, the magnetostrictive element 4 is not driven at mechanical resonance by a local signal source but excited merely from the energy available in the incoming signal. Hence, there is no requirement imposed on this signal of phase coherence. If such a provision is desired, an additional driving coil can be affiliated with the magnetostrictive member and supplied with a local signal whose frequency and phase matches that of the wanted signal.

Figure 2:
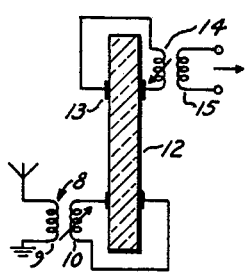
FIG. 2 illustrates the application of the present invention to a piezoelectric dynamic filtering arrangement.

FIG. 2 illustrates a piezoelectric equivalent of the circuit of FIG. 1. Here, the incoming signals are inductively coupled via transformer 8 having a primary 9 and a tuned secondary 10 to the electrodes 11 of a piezoelectric element 12. In this arrangement, the capacitance between the electrodes 11 and the inductance of the secondary winding 10 form an LC circuit tuned to resonance at the wanted signal. Consequently, when this signal is present, maximum voltage is available across the electrodes for driving the piezoelectric member. This member, like magnetostrictive element 4, vibrates at a fundamental or multinode when the proper voltage wave form is available at the driving circuit, and the output voltage is taken across a second pair of electrodes 13 connected in an LC resonant circuit with inductance 14. The operation of this piezoelectric configuration is much like that of the magnetostrictive unit previously described, with the inertial effect of the vibrating piezoelectric member again preventing any substantial coupling of noise and other disturbances between the input and output, and inductors 10 and 14 maximizing the input and output signal levels. To couple the output energy into the next stage of amplification, a pickup coil 15 can be employed. It will be appreciated that the disposition of the driving electrodes 11 depends upon the mode of vibration desired and that the polarization axis of the piezoelectric element defines the reference direction for all electrode orientations.

Figure 3:
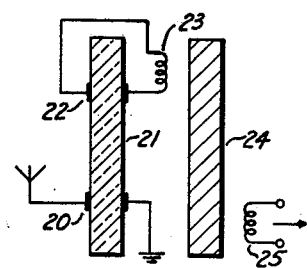
FIG. 3 illustrates a dynamic system where a piezoelectric and a magnetostrictive unit are in a tandem relationship with electrical coupling therebetween.

FIG. 3 shows a dynamic filtering arrangement consisting of cooperating piezoelectric and magnetostrictive vibrators. In this modification the input signals are directly applied across the electrodes 20 of the piezoelectric element 21 and the output is taken across a pair of electrodes 22 which are connected in an LC circuit with the driving coil 23 of a magnetostrictive element 24 having an output coil 25. Here, again, the vibrators are dimensioned to vibrate at similar fundamental or multinode resonance conditions when excited by voltage and current wave forms of the correct frequency. And the LC circuit is tuned to electrical resonance at the frequency of the mechanical vibrators so that maximum driving force is present to excite magnetostrictive member 24.

It will thus be seen that the piezoelectric member 21 and magnetostrictive member 24 are in what may be considered a tandem relationship by virtue of the LC circuit intercoupling them. That is, the integration time of the system may be twice that of the units shown in FIG. 1 and FIG. 2 since the vibrational stresses must transit the length of both elements sequentially before a signal can develop across output winding 25.

In FIGS. 1 and 2 there is only mechanical coupling between the input and output circuits; in the arrangement of FIG. 3, electrical coupling is also present. Instead of having the input energy first applied to the piezoelectric member and then to the magnetostrictive member, the opposite sequence may be employed. Also, the electrodes 20 and output coil 25 can serve as the capacitance and the inductance of a pair of input and output tuned circuits similar to those shown in FIGS. 1 and 2 for increasing the over-all sensitivity of the system.

Figure 4:
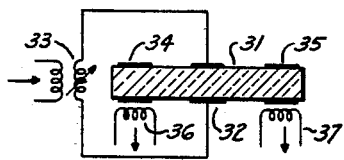
FIG. 4 illustrates an arrangement for driving a piezoelectric element in response to the voltage component of an input signal.

FIG. 4 illustrates one method of driving a piezoelectric element 31 in response to the voltage component of the input signal. Here, metallic electrodes 32, bonded, plated or otherwise secured to opposite sides of the vibrating element, cooperate with input coil 33 in an LC circuit tuned to resonance. Also secured to the vibrating element adjacent each end thereof are output metallic electrodes 34 and 35 which may be made of magnetostrictive material, depending upon the type of output coupling desired. With electrodes having such properties, the output can be taken via coils 36 and 37 inductively coupled thereto. With conventional metallic electrodes, the output can be taken via suitable conductors in a manner similar to that shown, for example, in the top portion of FIG. 2. It will thus be seen that in response to the voltage component of the incoming signal dimensional changes take place in the length of the piezoelectric element 31; that these changes result in accompanying variations in the length of the metallic output electrodes 34 and 35; and that, in the case where these last-mentioned electrodes are made of magnetostrictive material, these variations induce voltages across output coils 36 and 37. It would also be mentioned that the output voltage can be taken from the magnetostrictive mode by inductively coupled coils as shown or from the piezoelectric mode by conductors attached thereto or via both methods.

Figure 5:
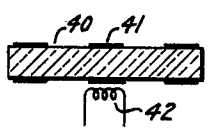
FIG. 5 illustrates one arrangement for driving a piezoelectric member in response to the current component of the input signal.

In FIG. 5 there is depicted an arrangement for driving a piezoelectric element 40 in response to the current component of the input signal. To realize this mode of operation, the vibrating element has metallic electrodes of magnetostrictive material secured to opposite sides thereof at a point intermediate its length, and inductively associated with these electrodes is a driving coil 42 which forms part of a tuned LC circuit such as the one disclosed in the lower portion of FIG. 1. Either one of the various output techniques previously described in connection with the modification of FIG. 4 can be utilized in this configuration.

Figure 6:
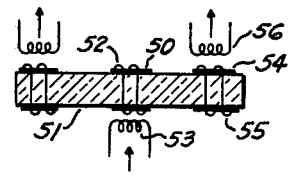
FIG. 6 illustrates a driving arrangement wherein the voltage and current components of the input signal combine to excite the vibrating element.

FIG. 6 illustrates an arrangement wherein the capacitance of metallic electrodes 50, which are of magnetostrictive material and which drive mechanical element 51 made of piezoelectric material, is tuned by the inductance of a driving coil 52 which, together with coil 53, forms the input circuit. With this type of drive, the voltage component across the electrodes excites vibration in the piezoelectric mode, and this vibration is accentuated by that which occurs as a result of the magnetostrictive excitation provided by coil 52. This association of components is the electrical equivalent of the input portion of FIG. 2. Output electrodes 54 are made of magnetostrictive material, and cooperating therewith is a coil 55 which serves with coil 56 to inductively couple the output voltage to the next amplifying stage and to tune the capacitance of these electrodes to an electrically resonant condition, thereby duplicating the output portion of FIG. 2. It would be emphasized that because maximum current is available at coil 52 and maximum voltage is simultaneously present across electrodes 50, the conditions necessary for developing maximum piezoelectric and magnetostrictive stresses are present, and these stresses combine within element 51 to increase its amplitude of vibration.

Figure 7:
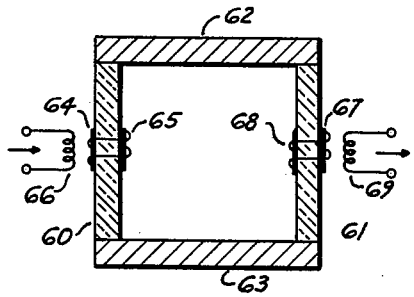
FIG. 7 shows a dynamic filtering arrangement with mechanical coupling between the input and output circuits.

In FIG. 7 there is illustrated a signal selective device wherein the input and output circuits, consisting of electrode 64 of magnetostrictive material and cooperating inductively coupled coils 65 and 66, an electrode 67 of magnetostrictive material and cooperating inductively coupled coils 68 and 69, respectively, are positioned on opposite sides of a closed loop formed by sections 60, 61, 62 and 63. This geometry increases the inertial effect between the above circuits over that obtainable with the apparatus of FIG. 6, since the vibrational stresses must travel longer paths to reach the output circuit, which paths include yoke sections 62 and 63. It would be pointed out that in this assembly only members 60 and 61 need have piezoelectric properties, and yokes 62 and 63 may be made of any suitable metal or dielectric. Moreover, the dimensions of the various elements should be proportioned with respect to the wave length of the wanted signal so that the stresses traveling through sections 62 and 63 reenforce each other when they combine in the output unit 61.

An inspection of the apparatus of FIG. 7 will show that coupling yokes 62 and 63 will not have the same mode of vibration as units 60 and 61. However, there are many configurations of the mechanical system available where an elastic wave propagated in one direction excites the propagation of an elastic wave in a direction at right angles thereto.

It will be recalled that in FIG. 3 the LC circuit, consisting of electrodes 22 and coil 23, provides a form of electrical coupling between the vibrating elements 21 and 24 affiliated with the input and output circuits. This type of coupling obviously does not influence the over-all dynamic inertia of the system. However, in FIG. 7 the coupling between the input and output circuits is procured by mechanical means, namely, sections 62 and 63 and, consequently, this modification possesses the greater dynamic inertia. It would also be pointed out that sections 62 and 63 can be made of piezoelectric material so as to permit the complete loop to be formed in one simple casting operation. Also, such a structure would permit electrodes to be placed along sections 62 and 63 for signal injection and pickup purposes.

It will be appreciated that vibrating elements 4 and 24 in FIGS. 1 and 3 may be made of any well-known magnetostrictive material. However, nickel is particularly suitable because of its relatively high magnetostrictive properties. As regards the selection of the piezoelectric material for the other vibrating elements, polarized barium titanate ceramic is recommended.

Obviously many modifications and variations of the present invention are possible in the light of the above teachings. It is therefore to be understood that within the scope of the appended claims the invention may be practiced otherwise than as specifically described.

What is claimed is:

1. A dynamic filtering arrangement comprising, in combination, a piezoelectric element, said element having pairs of electrodes secured to its midportion and adjacent each extremity thereof, said pairs of electrodes being made of a material which has magnetostrictive properties, a coil connected across each pair of electrodes and inductively coupled thereto, an input coil inductively coupled to the coil associated with the pair of electrodes secured to the midportion of said piezoelectric element, means for applying incoming signals to said coil, and means for inductively coupling output signals from the coils associated with the pairs of electrodes secured adjacent each extremity of said piezoelectric element.

2. A dynamic filtering arrangement comprising, in combination, first and second equal length piezoelectric elements, each of said elements having metallic electrodes made of a material having magnetostrictive properties attached thereto at a point intermediate its length, a coil connected across each pair of metallic electrodes and forming with the capacitance of said electrodes an LC circuit tuned to a particular resonant frequency, means for coupling input signals to one of said coils, means for inductively coupling output signals from the other coil, said first and second piezoelectric elements being dimensioned to vibrate at the same mechanical resonance, and third and fourth members connecting said first and second piezoelectric elements in a closed square loop whereby elastic waves excited within one of said piezoelectric elements in response to input signals travel in opposite directions from the midportion of this piezoelectric element via said third and fourth members to recombine within said other piezoelectric element.

3. For use in a dynamic filtering arrangement, the combination of a piezoelectric element having spaced pairs of input and output electrodes, said element being dimensioned to vibrate at mechanical resonance when the voltage across said pair of input electrodes has a predetermined frequency, a transformer, means for coupling input signals to the primary winding of said transformer, means for connecting the secondary of said transformer across said input electrodes, the inductance of said secondary winding and the capacitance of said pair of input electrodes forming an LC circuit tuned to resonance at said predetermined frequency whereby said piezoelectric element is excited to maximum vibration when a signal corresponding to said predetermined frequency is present as an input signal, an output transformer, and means for connecting the primary of said output transformer across said pair of output electrodes, the inductance of the primary of said output transformer and the capacitance of said pair of output electrodes forming an LC circuit tuned to resonance at said predetermined frequency.

4. For use in a dynamic filtering arrangement, the combination of a piezoelectric element, a pair of metallic electrodes made of a material having magnetostrictive properties attached to opposite sides of said element, said piezoelectric element being dimensioned to vibrate in mechanical resonance when the voltage across said pair of metallic electrodes has said particular frequency, a magnetizing coil connected across said pair of metallic electrodes and forming with the capacitance of said pair of electrodes an LC circuit tuned to a particular resonant frequency, said magnetizing coil being disposed with respect to said electrodes such that the magnetized field developed by said coil when current flows therethrough intercepts said electrodes and causes magnetostrictive stresses therein, means for coupling input signals to said magnetizing coil, a pair of metallic output electrodes attached to said piezoelectric element adjacent one end thereof, said pair of output electrodes being made of a material having magnetostrictive properties and a pickup coil inductively coupled to said pair of output electrodes.

References Cited in the file of this patent
UNITED STATES PATENTS

| | | |
|---|---|---|
| 1,450,246 | Cady | Apr. 3, 1923 |
| 1,882,396 | Pierce | Oct. 11, 1932 |
| 1,997,599 | Pierce | Apr. 16, 1935 |
| 2,001,132 | Hansell | May 14, 1935 |
| 2,001,387 | Hansell | May 14, 1935 |
| 2,002,191 | Runge | May 21, 1935 |
| 2,005,083 | Hansell | June 18, 1935 |
| 2,018,358 | Hansell | Oct. 22, 1935 |
| 2,101,272 | Scott | Dec. 7, 1937 |
| 2,318,417 | Phelps | May 4, 1943 |
| 2,345,491 | Mason | Mar. 28, 1944 |
| 2,501,488 | Adler | Mar. 21, 1950 |
| 2,571,019 | Donley | Oct. 9, 1951 |
| 2,579,996 | Barton | Dec. 25, 1951 |
| 2,617,882 | Roberts | Nov. 11, 1952 |
| 2,652,542 | Anthony | Sept. 15, 1953 |
| 2,695,357 | Donley | Nov. 23, 1954 |
| 2,814,785 | Burns | Nov. 26, 1957 |
| 2,834,943 | Grisdale et al. | May 13, 1958 |
| 2,837,668 | Simpson | June 3, 1958 |
| 2,965,861 | Sharma | Dec. 20, 1960 |